(12) United States Patent
Akahoshi (10) Patent No.: US 8,121,006 B2
(45) Date of Patent: Feb. 21, 2012

(54) APPARATUS AND METHOD FOR USING REPLACEMENT AREAS HAVING CERTAIN USAGE DIRECTIONS, BASED ON WHETHER DEFECTS ARE REGISTERED AS RE-ALLOCATED OR CONTIGUOUS RE-ALLOCATED DEFECT TYPES, IN A RECORDING MEDIUM

(75) Inventor: Kenji Akahoshi, Yokohama (JP)

(73) Assignees: Hitachi - LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 42 days.

(21) Appl. No.: 12/695,767

(22) Filed: Jan. 28, 2010

(65) Prior Publication Data

US 2011/0002206 A1    Jan. 6, 2011

(30) Foreign Application Priority Data

Jul. 6, 2009  (JP) .................................. 2009-159414

(51) Int. Cl.
*G11B 20/18*    (2006.01)
(52) U.S. Cl. .................................................... 369/53.17
(58) Field of Classification Search ........................ None
See application file for complete search history.

(56) References Cited

U.S. PATENT DOCUMENTS

| | | | |
|---|---|---|---|
| 2005/0141400 A1* | 6/2005 | Hwang et al. | 369/275.3 |
| 2005/0175323 A1* | 8/2005 | Hoshizawa | 386/125 |
| 2006/0034411 A1 | 2/2006 | Park | |
| 2010/0157751 A1* | 6/2010 | Yamamoto et al. | 369/47.14 |
| 2010/0226228 A1* | 9/2010 | Akahoshi | 369/53.17 |

FOREIGN PATENT DOCUMENTS

JP    08-050766    2/1996

OTHER PUBLICATIONS

"DVD-RAM Technology", edited by TRICEPS Planning Department, published by TRICEPS Cor., 2000, pp. 29-33 (English translation attached).

* cited by examiner

*Primary Examiner* — Will J Klimowicz
*Assistant Examiner* — Mark Fischer
(74) *Attorney, Agent, or Firm* — Kilpatrick Townsend & Stockton LLP (57) ABSTRACT

To prevent the degradation in read access performance to replacement data caused by not selecting appropriate replacement clusters and to suppress the waste of the number of DFL registrations. Attention is paid to the usage direction of a user data area and that of a replacement area, and in the case where one CRD-type DFL registration can be made collectively in the sequential defect management processes, a replacement area of which the usage direction is the same as that of the user data area is selected.

12 Claims, 11 Drawing Sheets

| STATUS 1 | DEFECTIVE CLUSTER FIRST PSN | STATUS 2 | REPLACEMENT CLUSTER FIRST PSN | |
|---|---|---|---|---|
| 0001 | A | 0001 | a | ⎫ CRD |
| 0010 | C | 0010 | c | ⎭ |
| 0001 | U | 0001 | u | ⎫ CRD |
| 0010 | Z | 0010 | z | ⎭ |

| | | | | |
|---|---|---|---|---|
| 0001 | B | 0001 | os3 | } CRD |
| 0010 | D | 0010 | os1 | |
| 0000 | E | 0000 | os4 | } RAD |
| 0001 | I | 0001 | os7 | } CRD |
| 0010 | K | 0010 | os5 | |
| 0000 | M | 0000 | os8 | } RAD |

| 0001 | B | 0001 | is1 | } CRD |
|------|---|------|-----|-------|
| 0010 | E | 0010 | is4 | |
| 0001 | I | 0001 | os7 | } CRD |
| 0010 | K | 0010 | os5 | |
| 0000 | M | 0000 | os8 | } RAD |

APPARATUS AND METHOD FOR USING REPLACEMENT AREAS HAVING CERTAIN USAGE DIRECTIONS, BASED ON WHETHER DEFECTS ARE REGISTERED AS RE-ALLOCATED OR CONTIGUOUS RE-ALLOCATED DEFECT TYPES, IN A RECORDING MEDIUM

INCORPORATION BY REFERENCE

The present application claims priority from Japanese application JP 2009-159414 filed on Jul. 6, 2009, the content of which is hereby incorporated by reference into this application.

BACKGROUND OF THE INVENTION

1. Field of the Invention

The present invention relates to apparatuses and methods for recording/reproducing on/from a medium, and in particular relates to a defect management method in a recording/reproducing apparatus using areas used for defect management process on a medium.

2. Description of the Related Art

Today, recording/reproducing apparatuses are known which irradiate an optical disc-like recording medium represented by a CD-R/RW (CD Recordable/Rewritable), a DVD±R/RW (DVD±Recordable/Rewritable Disc), a DVD-RAM (DVD-Random Access Memory), a Blu-ray Disc (registered trademark, hereinafter referred to as a BD) and the like, with a laser beam using a semiconductor laser to record data. In the rewritable or write-once optical disc medium, a defective portion on the medium occurs due to a flaw caused by partial damage of the medium, fingerprint, dirt, degradation of a recording film, etc., and accordingly, even if data is recorded on the defective portion, the data is most likely to be unable to be read. As one of the methods that extend the life of the disc by avoiding such a defect on the disc face, there is a defect management method called "linear replacement" that instead of recording the data on the defective portion, records the data in a replacement area (alternate recording area) on the same optical disc. This method is already applied to the DVD-RAM, which is described in pp. 29-31 of "DVD-RAM technology" edited by TRICEPS Planning Department, published by TRICEPS Corp., 2000. This technology has been already applied to the BD as well, wherein during recording in a unit of a cluster in a user data area, a cluster unsuccessful in recording or one successful in recording but unsuccessful in verifying is recorded in the replacement area on the disc. Note that a cluster corresponds to a unit of the minimum recording block in the present invention. Then, address information of a detected defective cluster and address information of the cluster recorded in the replacement area are registered as a defect list (DFL) in a management area on the disc. Several types of DFLs are also defined, and as this example, a defective area is registered as a Re-Allocated Defect (RAD) type when the defective area has only one defective cluster, while the defective area is registered as a Contiguous Re-allocated Defect (CRD) type when the defective area has two or more consecutive clusters. For example, when a defective area has ten consecutive clusters, ten DFL registrations are required to register the defective area as the RAD type. However, only two DFL registrations are required to register the defective area as the CRD type and the number of DFL registrations in the management area can be reduced. This is described in JP-A-2008-510263. Reading this DFL during reproduction makes it possible to read a replacement cluster recorded in the replacement area instead of reading a cluster designated by a recording command from a host.

Moreover, JP-A-08-050766 discloses as follows:

when a defective cluster occurs in the user data area on a recording medium, a replacement cluster is searched in a replacement area closest to this defective cluster, and it is then determined whether or not the searched replacement cluster has any space to record the cluster. If it has, the access distance to the replacement cluster is reduced by performing the defect management process in this replacement area, and the defect management process is performed efficiently.

SUMMARY OF THE INVENTION

Consider the case where on a medium having a user data area and a plurality of replacement areas (e.g., inner and outer replacement areas), at least two types of DFL, i.e. a RAD type and a CRD type, are defined, and a replacement area of which the usage direction is the same as that of the user data area and another one of which the usage direction is different from that of the user data area are mixed.

In performing the defect management process on this medium, a replacement area close to the location where a defect occurs is typically used from the viewpoint of data accessibility.

For example, a method may be contemplated, in which data is recorded in a replacement area more closely located on the same layer or in a replacement area located on a different layer but with a smaller radial movement.

Alternatively, a method may be contemplated, in which a threshold value is set according to a radial position on a disc or the capacity of a disc and when the radial position or the capacity is smaller than the threshold value, data is recorded in an inner replacement area while when the radial position or the capacity is equal to or greater than the threshold value, data is recorded in an outer replacement area.

As described above, replacement areas are often determined according to the positional relationship between the defective area and replacement areas, or according to the recording conditions of the replacement areas.

However, if a defect that occurs is the CRD type defect and the usage direction of a selected replacement area is different from that of the user data area, then there is a problem that read access performance in reproducing replacement data recorded in the replacement area degrades because the usage directions differ from each other. There is also a problem that the number of DFL registrations increases.

Accordingly, the present invention challenges these problems, and it is an object of the present invention to prevent the degradation in read access performance to replacement data and suppress the waste of the number of DFL registrations by paying attention to a method of selecting a replacement area.

The above-described problems are solved by the present invention as set forth in the claims, as an example.

The present invention enables to achieve an appropriate recording operation and increase the user convenience.

Other objects, features and advantages of the invention will become apparent from the following description of the embodiments of the invention taken in conjunction with the accompanying drawings.

DETAILED DESCRIPTION OF THE EMBODIMENTS

Hereinafter, embodiments of the present invention will be described using the accompanying drawings.

Embodiment 1

Now, a first embodiment of the present invention is described using the accompanying drawings.

Figure 1:
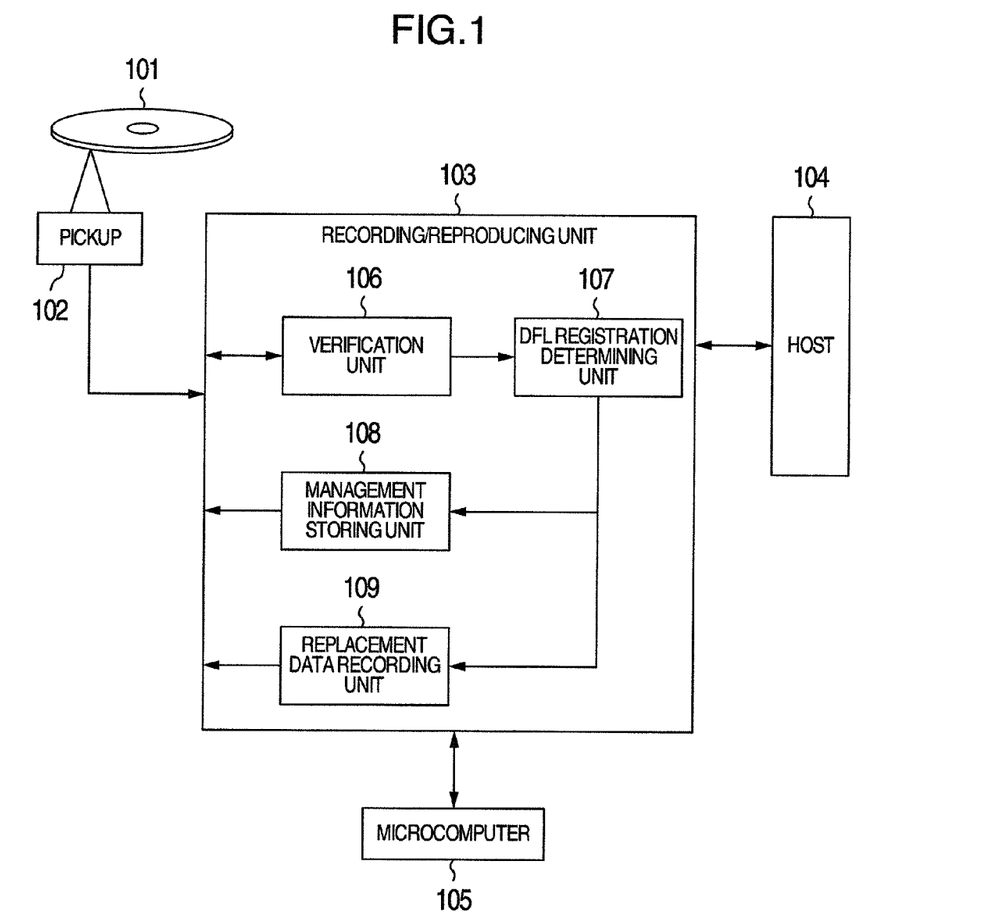
FIG. 1 is a block diagram showing a configuration of a recording/reproducing apparatus relating to a first embodiment of the present invention.

FIG. 1 is a block diagram showing a configuration of a recording/reproducing apparatus relating to the embodiment of the present invention. Hereinafter, the description is made using the accompanying drawings.

In the figure, reference numeral 101 represents an optical disc capable of recording/reproducing data, the optical disc having thereon a user data recording area, a disc management information recording area, and an area used for defect management process, reference numeral 102 represents a pickup for reading a recording signal from the optical disc 101, and reference numeral 103 represents a data recording/reproducing unit. Although not illustrated in the figure, the data recording/reproducing unit 103 comprises all units required for outputting data read from the pickup to a host 104 of an external device or recording data from the host 104 on the disc, such as a servo control unit for controlling the pickup 102, a data modulating/demodulating unit, an error correcting unit, a temporary storage unit for storing data, a temporary-storage-unit controlling unit for controlling the temporary storage unit, and a host I/F unit for interacting with the host 104 in accordance with a protocol represented by ATAPI (AT Attachment Packet Interface). Reference numeral 105 represents a microcomputer for controlling the data recording/reproducing unit. Reference numeral 106 represents a verification unit for performing a verification process to reproduce the data recorded on the disc 101 and determine a reproduction result, reference numeral 107 represents a DFL registration determining unit for determining the type of DFL registration based on an outcome determined by the verification unit 106, reference numeral 108 represents a management information storing unit for storing management information including DFL information in a management information storage area on the disc 101 based on an outcome determined by the DFL registration determining unit 107, and reference numeral 109 represents a replacement data recording unit for recording replacement data in a replacement area on the disc 101 based on an outcome determined by the DFL registration determining unit 107.

Figure 2:
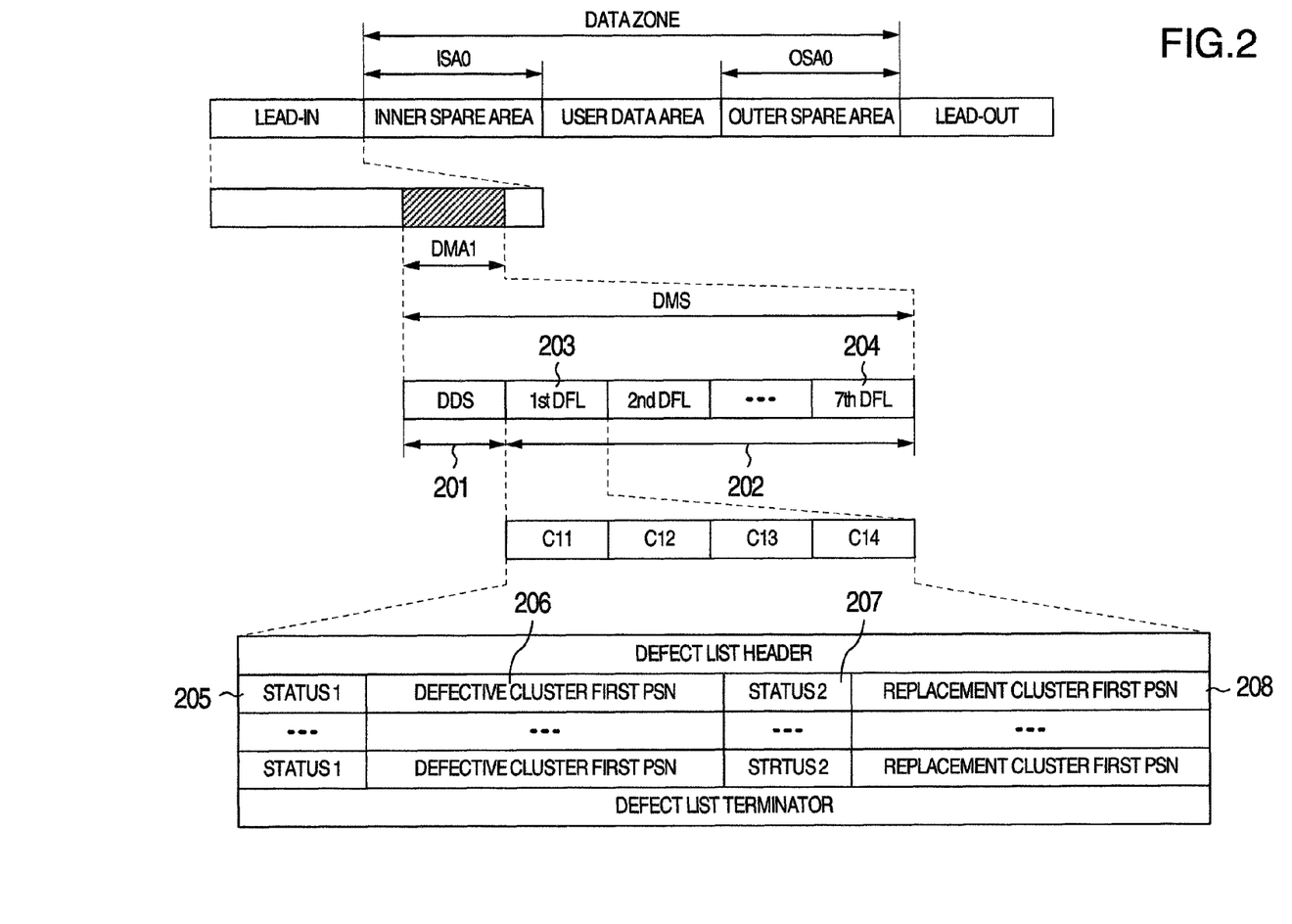
FIG. 2 is a diagram showing an overall disk structure of a BD-RE SL (Single Layer).

FIG. 2 is a diagram showing an overall disk structure of a BD-RE SL (Single Layer). The BD-RE SL comprises three main areas, i.e. a lead-in area, a data zone area, and a lead-out area. Furthermore, the data zone area comprises an ISAO (Inner Spare Area O) used for defect management process located near to the inner periphery of the disk, a user data area, and an OSAO (Outer Spare Area O) used for defect management process located near to the outer periphery of the disk. A DMA (Disc Management Area) that records management information of the recording condition is present in the lead-in area and the lead-out area. Although DMAs 1 to 4 are defined for the BD-RE SL, only DMA 1 is described in this embodiment for simplification of the description. The DMA comprises a DMS (Disc Management Structure), and the DMS comprises a DDS (Disc Definition Structure) 201 and a DFL (Temporary Defect List) 202. The DDS includes the arrangement information of the DFL and the disc management information such as the capacity of ISAO and the capacity of OSAO. Moreover, the DFL is mainly used as a list for managing a replacement portion corresponding to a defective portion on the disc.

Here, the DFL is further described. The DFL of the BD-RE SL comprises the first position 203 to the seventh position 204, wherein the actually effective position among these positions is only one. The first position 203 is used at the beginning of recording, and when the recording on the relevant block is unsuccessful after overwriting several times to result in "NG" in the verification process, then the effective position moves to the second position of DFL. Accordingly, if the positions of DFL up to the seventh position are used up, then the DFL registration cannot be made any more and recording in any replacement area cannot be made. However, there are cases where even if the positions of DFL up to the seventh position are not used up, any DFL registration may not be made and recording in any replacement area may not be made. Hereinafter, these cases are described. One position comprises four clusters as shown in the figure, wherein the DFL registration is made using one to four clusters.

The DFL is sandwiched by a "Defect List Header" and a "Defect List Terminator" and stored therebetween. The format for DFL registration comprises a "Status 1" field 205 indicative of the registration status of a defective cluster, a "Defective Cluster first PSN" indicative of the defective cluster address 206, a "Status 2" field 207 indicative of the registration status of a replacement cluster, and a "Replacement Cluster first PSN" indicative of the replacement cluster address 208. In the status field, a value to be registered differs between the case where the defective area has only one cluster and the case where it has a plurality of consecutive clusters. In performing the replacement of one cluster, the values of the Status 1 and Status 2 are set to 0000b (in binary notation), respectively, indicative of the RAD. Moreover, in indicating the replacement of a plurality of consecutive clusters, one CRD information is shown with two rows of status fields, unlike the case of the RAD. The value of the Status 1 field 205 in the first row is set to 0001b and the address 206 indicates the start address of the consecutive defective clusters, while the value of the Status 2 field 207 is set to 0010b and the address 208 indicates the start address of the consecutive replacement clusters. The value of the Status 1 field 205 in the second row is set to 0001 b and the address 206 indicates the end address of the consecutive defective clusters, while the value of the Status 2 field 207 is set to 0010b and the address 208 indicates the end address of the consecutive replacement clusters. That is, the CRD registration is applicable to two or more consecutive RAD type clusters.

Figure 3A:
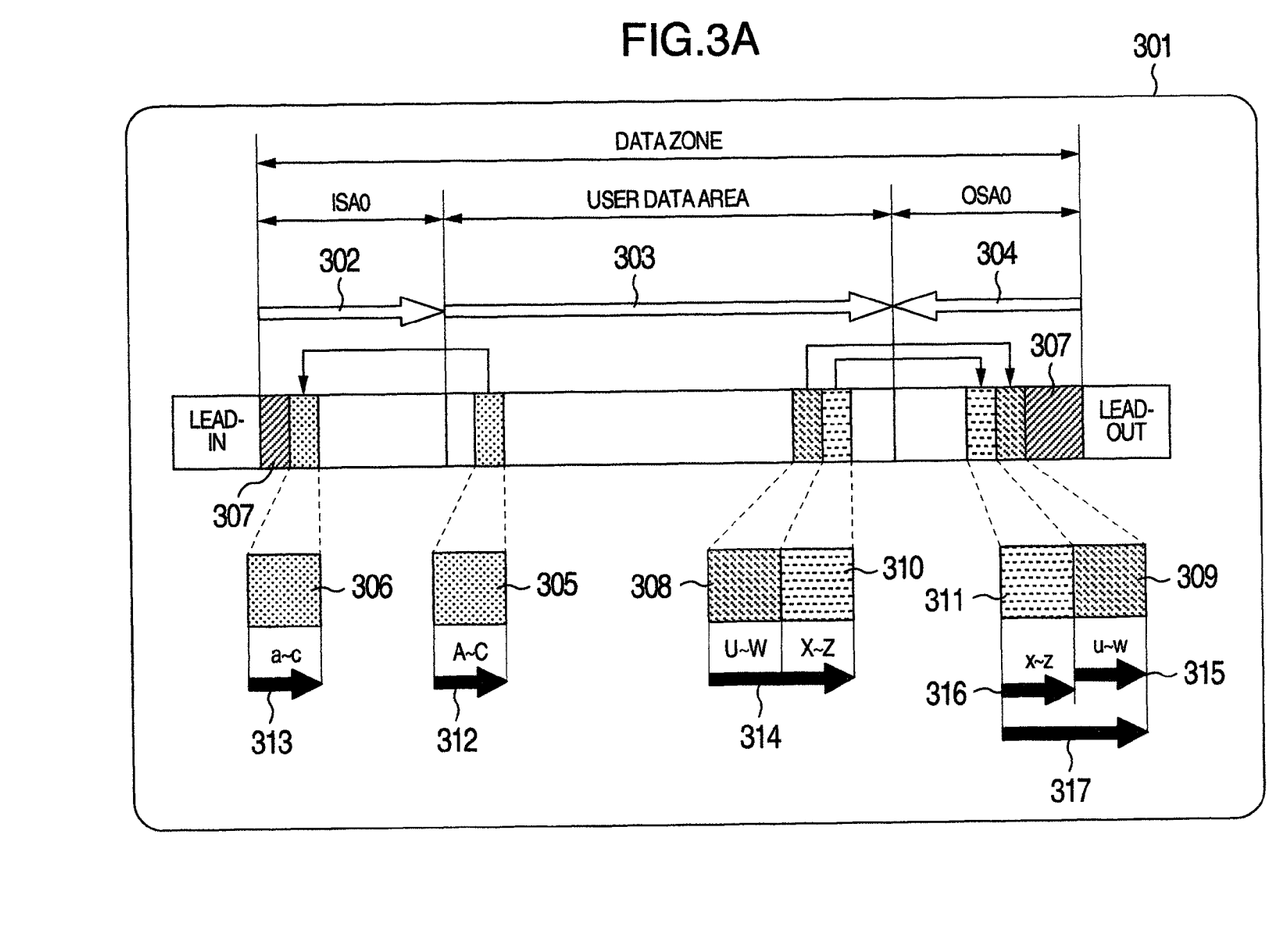
FIG. 3A is a diagram for illustrating a defect process method of the BD-RE SL.
Figure 3B:
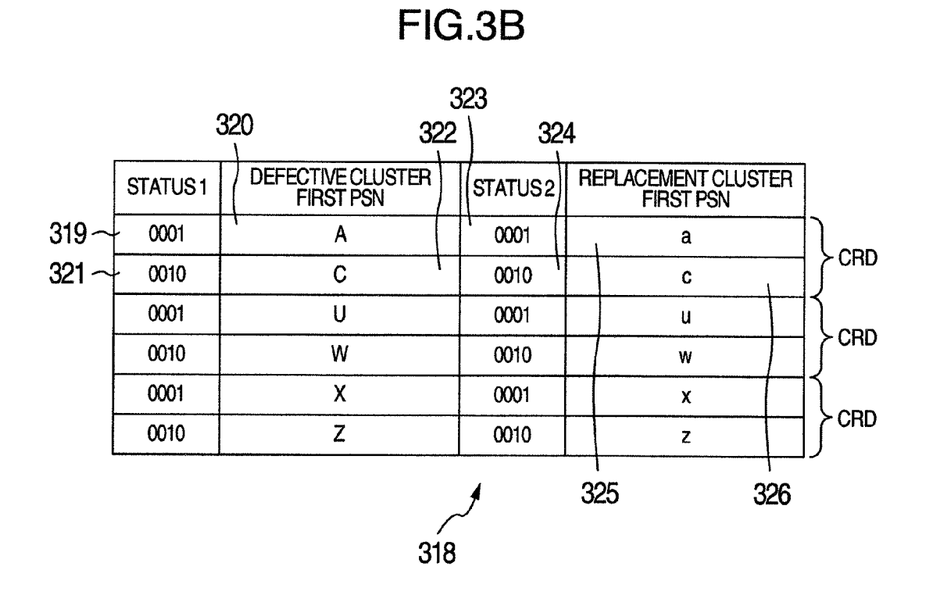
FIG. 3B is a diagram showing a DFL registration status in the case of FIG. 3A.

Next, a defect process method of the BD-RE is described using FIGS. 3A and 3B.

A diagram 301 shows the case where in a disc formatted so as to secure replacement areas in the ISAO and OSAO, the defect management process is performed during recording in a user data area. As described in FIG. 2, the disc comprises the lead-in area, the data zone area, and the lead-out area, wherein the ISAO is located inside the data zone area on the disk and the OSAO is located outside that. These areas are used as replacement areas for defects found during recording the user data.

Next, consider the case where the applicable scope of the CRD currently employed in the BD-R is expanded so that the CDR can be applied also to the BD-RE. Here, a defect management process method in the case where a defect is found during recording user data is described. Moreover, adopt a rule that the defect management process is performed in a replacement area close to the location where a defective cluster occurs.

Replacement areas in the ISAO and OSAO on the BD-RE are secured according to a command from a host device (precisely speaking, a command from an application) in advance at the time of formatting the disc. An arrow 302 in the figure indicates the usage direction (recording/reproducing direction) of the ISAO, and indicates that the clusters are used sequentially from the lead-in area side. Likewise, an arrow 303 indicates the usage direction of the user data area, and an arrow 304 indicates the usage direction of the OSAO. As apparent from the figure, the usage direction of the OSAO is opposite to the usage direction of the user data area. Here, consider the case where a plurality of consecutive defective clusters are found during recording in the user data area.

In the case where defective clusters 305 are found during recording the user data, if the defect management process is performed in a replacement area 306, i.e. the closest replacement area in the ISAO, then the ISAO is used in the direction of the arrow 302. Accordingly, the user data is written in the area immediately following to a used area 307. Moreover, in the case where defective clusters 308 are found during recording the user data, if the defect management process is performed in a replacement area 309, i.e. the closest replacement area in the OSAO, then the OSAO is used in the direction of the arrow 304. Accordingly, data is written in the area immediately following to a used area 307. Afterward, if defective clusters 310 are found as with the defective clusters 308, then the data is recorded in a replacement area 311 that is the area to be used next.

Now, consider the case where the recorded replacement data of replacement clusters is read.

When a command to read logical data, which should have been recorded in an area indicated by an arrow 312, comes from a host, the data to be actually read and outputted to the host is data recorded in the replacement area 306 indicated by an arrow 313. Accordingly, the recording/reproducing apparatus can read, in the direction of the arrow 313, the data of a plurality of consecutive clusters with one read access. Next, consider the case where a command to read the logical data, which should have been recorded in an area indicated by an arrow 314, comes from the host. Since the addresses from the start address of the defective clusters 308 to the end address of the defective clusters 310 are consecutive, the read process is supposed to be completed with one read access in the direction of an arrow 317. However, since the replacement data of the defective clusters 308 is recorded in the replacement area 309 and the replacement data of the defective clusters 310 is recorded in the replacement area 311, the end address of the replacement data 311 and the start address of a replacement data 309 are not consecutive.

In this arrangement, the first read access is performed in the direction of an arrow 315, and then the second read access is performed in the direction of an arrow 316. Therefore, due to the limitation of the usage direction of the OSAO, two read accesses are required although the read process supposedly can be performed with one read access in the direction of an arrow 317. As a result, read access performance degrades.

Here, it is described how the replacement information is recorded in the management area. The DMA, in which the location information on defective clusters and replacement clusters is recorded, is secured in the lead-in area and the lead-out area (see FIG. 2). Each of reference numerals A-Z in the diagram 301 represents data of one cluster in consecutive clusters. As shown here, the clusters A-C and clusters U-Z are verified as "NG" in the verification process of the recorded A-Z. In this case, since the clusters verified as "NG" are a plurality of consecutive clusters, the CRD type defect management process of the respective clusters is performed in replacement areas. Each of clusters a-c in the ISAO or each of clusters u-z in the OSAO also represents data of one cluster in consecutive clusters, and data of the defective clusters A-C, U-W, and X-Z are stored in the replacement clusters a-c, u-w, and x-z, respectively. A table 318 shows the DFL registration status at this time. The table 318 shows that the addresses of the consecutive defective clusters continue from the start address represented by reference numerals 319 and 320 to the end address represented by reference numerals 321 and 322. Moreover, so as to correspond one-to-one with the defective clusters information, reference numerals 323 and 325 represent the start address of the consecutive replacement clusters, while reference numerals 324 and 326 represent the end address of the consecutive replacement clusters. Since the clusters U-Z are consecutive clusters in the user data area, only one CRD type DFL registration is supposed to be required. However, as previously described, due to the limitation of the usage direction of the OSAO, two CRD type DFL registrations are required, resulting in the waste of the number of DFL registrations.

From the above, if the location of replacement clusters is determined without taking into consideration the type of defective clusters, two problems, i.e. the degradation in read access performance and the waste of the number of DFL registrations, will arise.

Figure 4A:
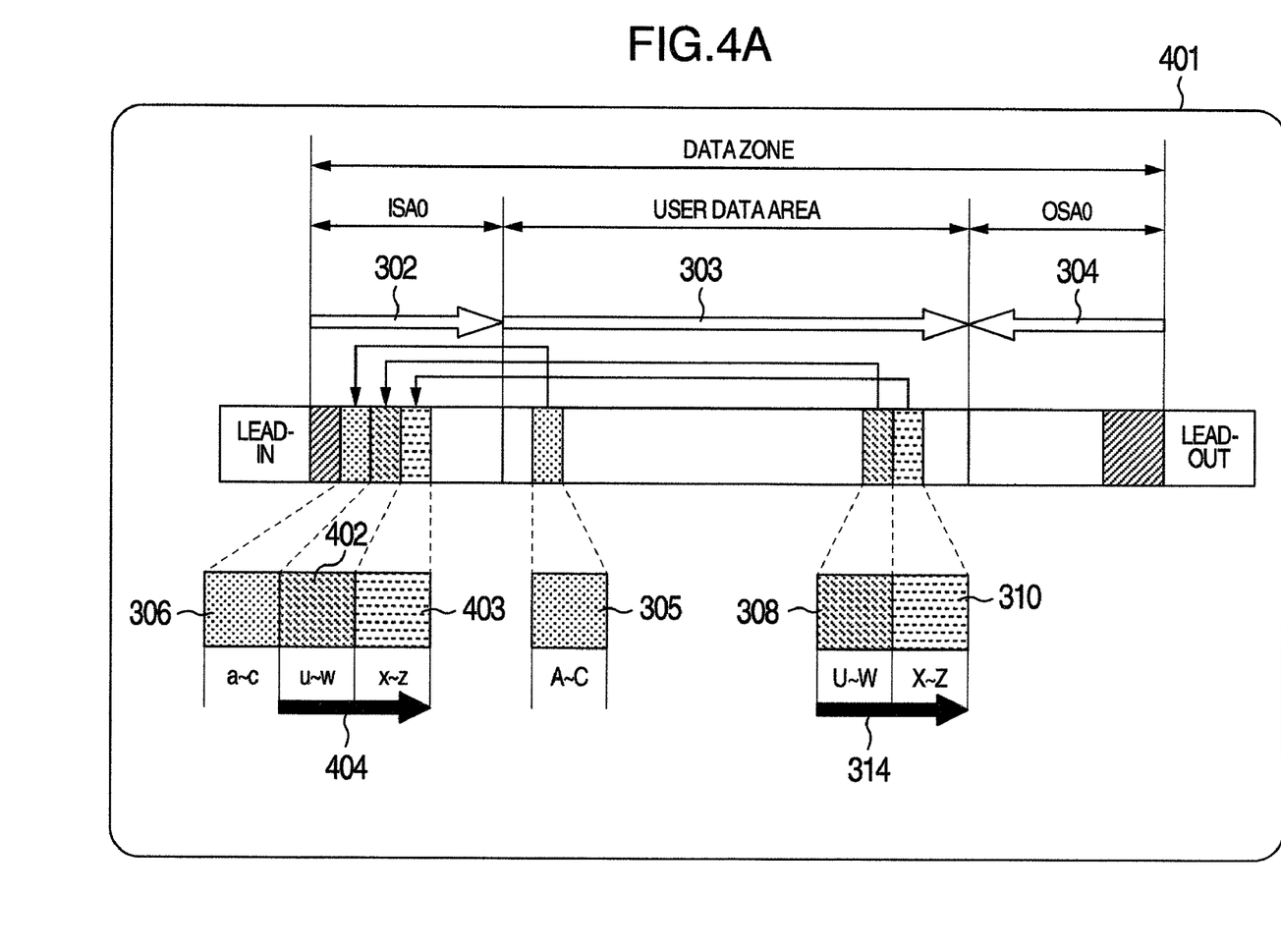
FIG. 4A is a diagram illustrating a method for resolving the problems.
Figure 4B:
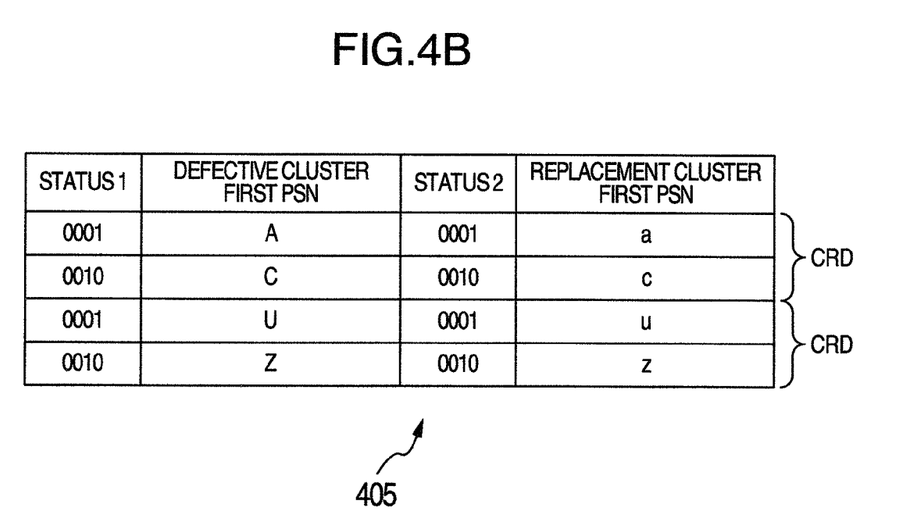
FIG. 4B is a diagram showing a DFL registration status in the case of FIG. 4A.

Next, a method for solving these problems is described using FIGS. 4A and 4B.

Assuming that the operation up to recording the defective clusters 305 as the replacement clusters in the replacement area 306 in the ISAO in a diagram 401 is the same as that in the diagram 301 of FIG. 3A, the next operation is described. If the recording in the user data area is continued even after recording a replacement data in the replacement area 306 and the defective clusters 308 are found, the defect management process is performed in a replacement area 402 in the ISAO of which the usage direction is the same as that of the user data area without selecting the OSAO because the usage direction of the OSAO which is the closest replacement area is opposite to that of the user data area. Since the ISAO is used in the direction of the arrow 302, the data is written in the area following to the used replacement area 306. Afterward, if the defective clusters 310 are found as with the defective clusters 308, then the data is recorded in a replacement area 403 which is to be used next.

Here, as with the previous case, consider the case where a command to read the logical data, which should have been recorded in an area indicated by the arrow 314, comes from a host.

Since the addresses from the start address of the replacement area 402 to the end address of the replacement area 403 continue, the read process is possible with one read access in the direction of an arrow 404.

Accordingly, to the area indicated by the arrow 314 in the case of the diagram 301, two read accesses are required, while to the same in the case of diagram 401, only one read access is required, thus preventing the degradation in read access performance.

Here, how the replacement information in the case of the diagram 401 is recorded in the management area is described.

Also in the diagram 401, each of reference numerals A-Z represents data of one cluster in consecutive clusters. The result of the verification process of the clusters A-Z shows that the clusters A-C and the clusters U-Z have been verified as "NG". In this case, the CRD type defect management process of the respective clusters having been verified as "NG" is performed in replacement areas. Each of the clusters a-c and u-z in the ISAO also represents data of one cluster of consecutive clusters, and data of the defective clusters A-C and U-Z are stored in the replacement clusters a-c and u-z, respectively. A table 405 shows the DFL registration status at this time. Since the clusters U-Z are consecutive clusters, only one CRD-type DFL registration is required.

Accordingly, in selecting the replacement clusters of replacement data, two CRD type DFL registrations are required in the case of the diagram 301, while only one CRD type DFL registration is required in the case of the diagram 401, thus preventing the waste of the DFL.

Moreover, in the case of the diagram 401, the ISAO is selected first as the replacement clusters for the defective clusters 308. However, even if the OSAO is selected first, it is possible to record the replacement data in the ISAO in the next process. For example, if the OSAO is selected first but it is determined that CRD can be registered together with the defective cluster 310, then the replacement data already recorded in the OSAO may be re-recorded in the replacement area 402 and thereafter the same process as that described above may be performed. Of course, the change of the replacement clusters from the OSAO to ISAO needs that of the DFL. Moreover, the replacement data may be re-registered in the OSAO again by performing the same process in the OSAO without changing the replacement clusters to the ISAO.

Next, an example taking into consideration the actual recording/reproducing operation of the recording/reproducing apparatus is described using FIGS. 5A, 5B, 5C, and 5D. When the recording/reproducing apparatus performs the recording process and the verification process, it typically performs them in a unit of a plurality of clusters. The verification process of one cluster after recording the one cluster would not pose any problem. However, in this embodiment, assuming the process in a unit of a plurality of clusters, the process in this unit will be referred to as a RAW (Read After Write) process.

Figure 5A:
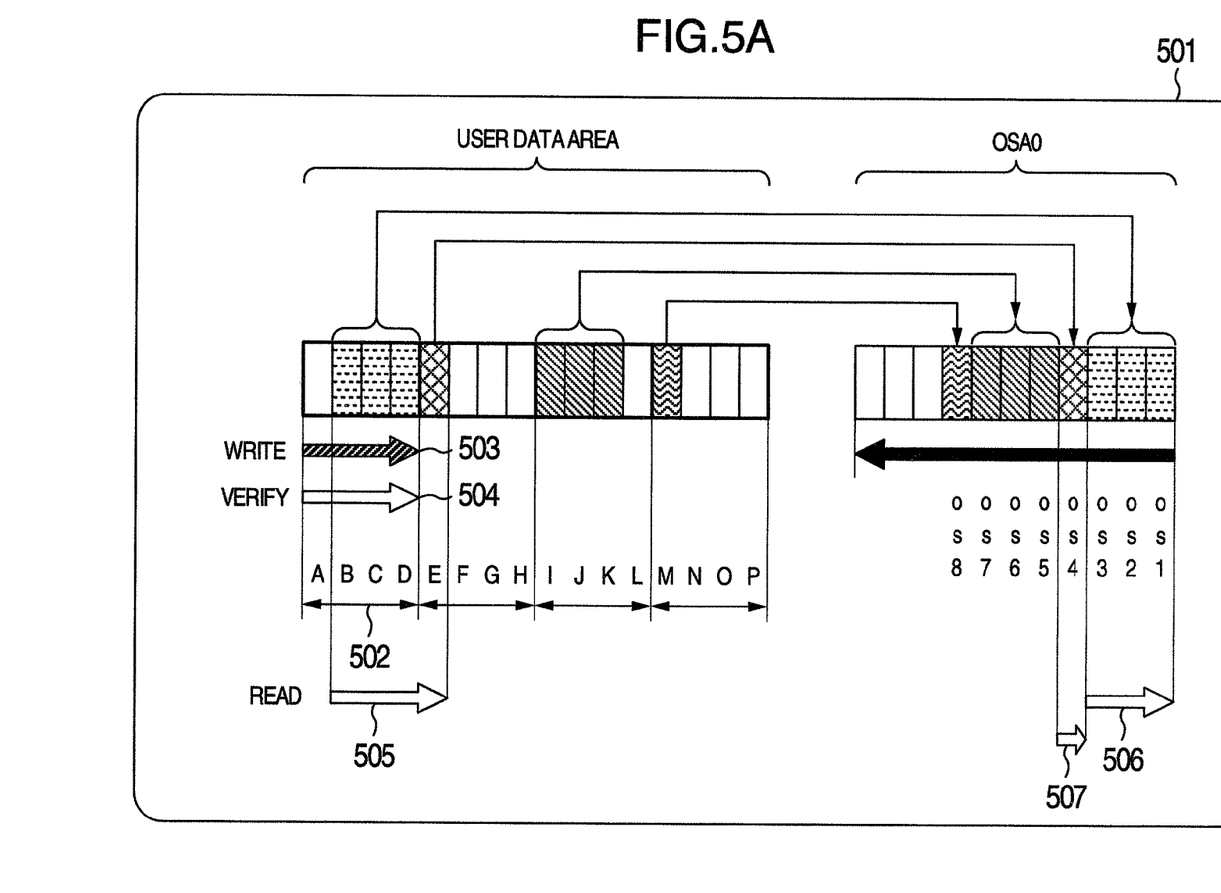
FIG. 5A is an illustration taking into account an actual recording/reproducing operation.

A diagram 501 of FIG. 5A shows the case where the RAW process is repeated in a unit of four clusters. The range indicated by an arrow 502 is a unit of RAW process (four clusters in the diagram). The RAW process comprises a recording process indicated by an arrow 503, and a verification process indicated by an arrow 504 that is performed thereafter. If a defective cluster is found in the RAW process, the recording in replacement areas is performed. Thereafter, during the RAW process, the process proceeds by repeating the recording process in replacement areas as needed.

Figure 5B:
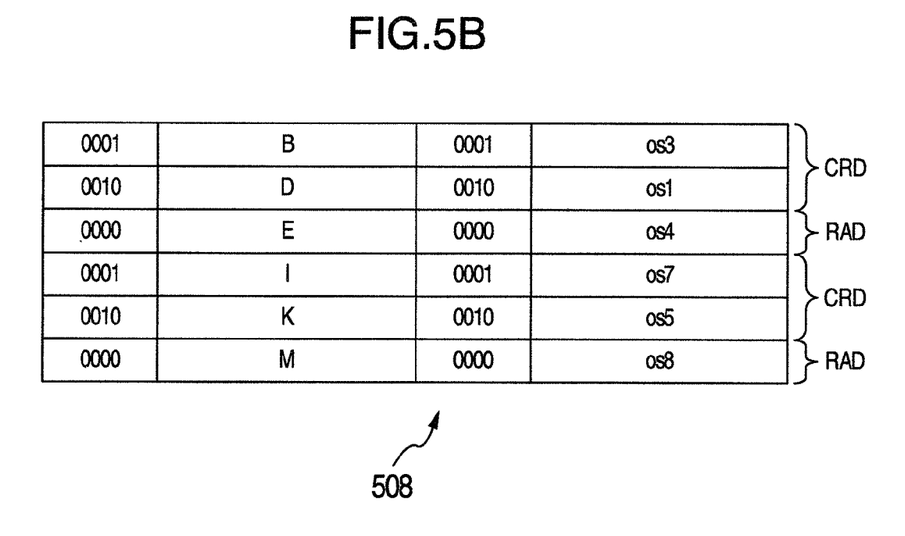
FIG. 5B is a diagram showing a DFL registration status in the case of FIG. 5A.

The diagram 501 corresponds to the diagram 301 in FIG. 3. Each of reference numerals A-P in the diagram 501 represents data of one cluster in the consecutive clusters in the user data area, wherein clusters B, C, D, E, I, J, K, and M are defective clusters. Moreover, each of reference numerals os1-os8 in the diagram represents data of one cluster in the consecutive clusters in the OSAO, which are used as replacement areas. Now, the operation will be described sequentially. First, in the RAW process in the range A-D, the clusters B-D are determined as defective clusters, and the recording in the replacement areas os3-os1 is performed. In the RAW process in the next range E-H, the cluster E is determined as a defective cluster and the recording in the replacement area os4 is performed. In the RAW process in the next range I-L, the clusters I-K are determined as defective clusters and the recording in the replacement areas os7-os5 is performed. Finally, in the RAW process in the M-P range, the cluster M is determined as a defective cluster and the recording in the replacement area os8 is performed. In this manner, the replacement data is recorded in the usage direction of the OSAO. Here, consider the case where a command to read the logical data, which should have been recorded in an area indicated by an arrow 505, comes from a host. Since the defective clusters B-E have consecutive addresses, the read access to the data in the replacement clusters thereof is also supposed be done with one access. However, since the replacement data of the defective clusters B-D are recorded in the areas os3-os1 and the replacement data of the defective cluster E is recorded in the area os4, the first read access is performed in the direction of an arrow 506 and then the second read access is performed in the direction of an arrow 507. Accordingly, the number of read accesses increases due to the limitation of the usage direction of the OSAO, resulting in the degradation in read access performance. Here, how the defect information in the case of the diagram 501 is recorded in the management area is described using a table 508.

Since the defective clusters B-E have consecutive addresses, the defective clusters B-E supposedly can be put together and registered as the CRD. However, since the addresses in the replacement clusters do not continue as described previously, the defective clusters B-E need to be divided into and registered as the CRD type and RAD type.

Figure 5C:
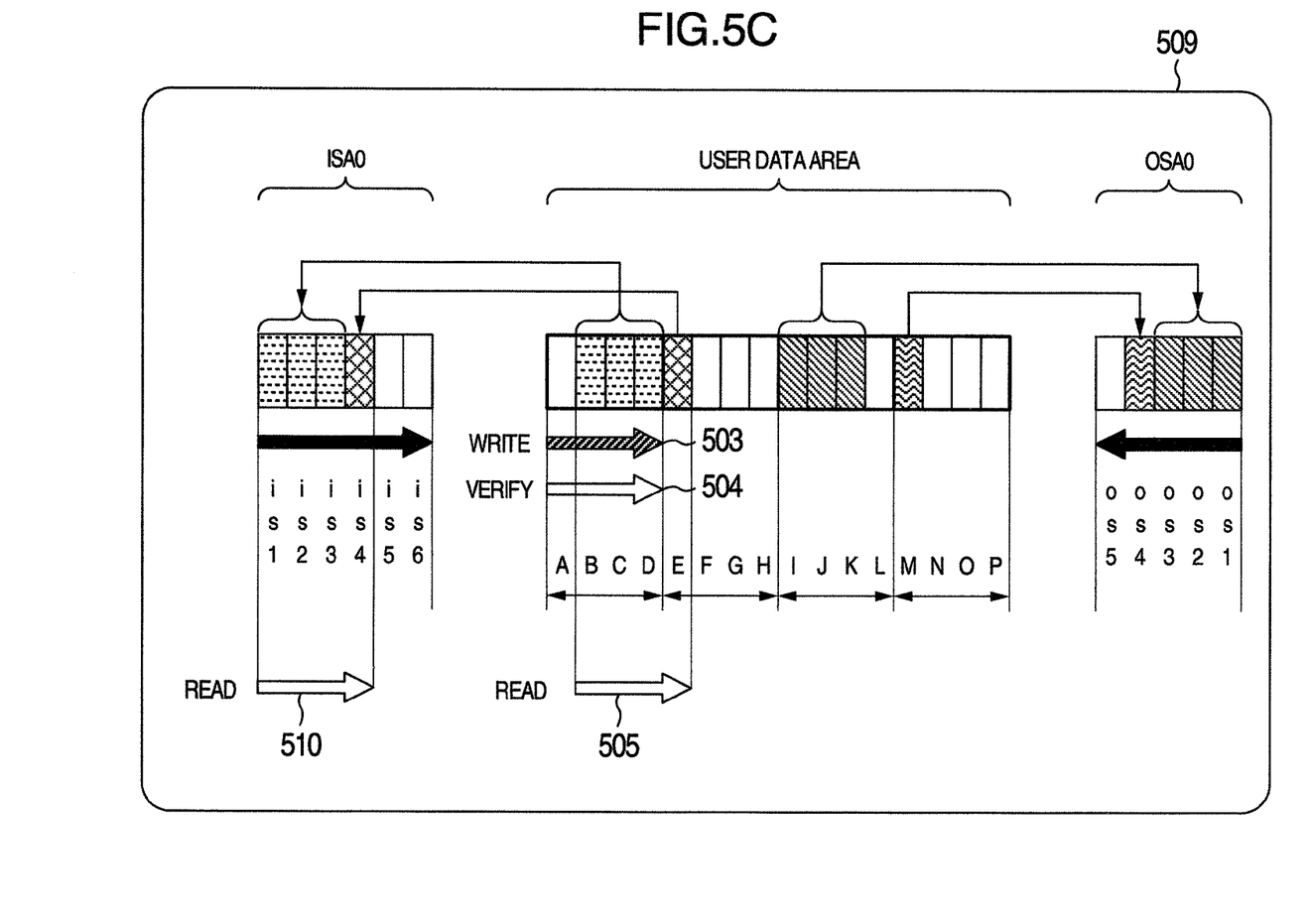
FIG. 5C is a diagram illustrating a method for solving the problems illustrated in FIG. 5A.

Next, a method for solving these problems is described using a diagram 509. Assume that the locations of the defective clusters in the user data area are the same as those in the case of the diagram 501. Moreover, each of reference numerals is1-is6 in the diagram represents data of one cluster in the consecutive clusters in the ISAO. Now, the operation will be described sequentially. First, when the clusters B-D are determined as defective clusters in the RAW process in the range A-D, the ISAO or OSAO are selectable as the replacement clusters. However, if the clusters including the last cluster in the RAW process are defective clusters, then the ISAO is selected as the replacement clusters, and if the clusters including the first cluster in the RAW process in the next range E-H are defective clusters, then the ISAO is selected as the replacement clusters.

That is, in the case of the diagram 509, if at least the cluster D in the clusters A-D is defective, then the ISAO is selected as the replacement clusters and the replacement data is recorded therein, and if the clusters including at least the cluster E in the clusters E-H are defective, then the ISAO is selected as the replacement clusters and the replacement data is recorded therein as with the previous RAW process.

That is, in two sequential RAW processes, if the last cluster in the first RAW process and the first cluster in the next RAW process might be able to be put together and registered as a CRD type defect, a replacement area of which the usage direction is the same as that of the user data area is selected.

Figure 5D:
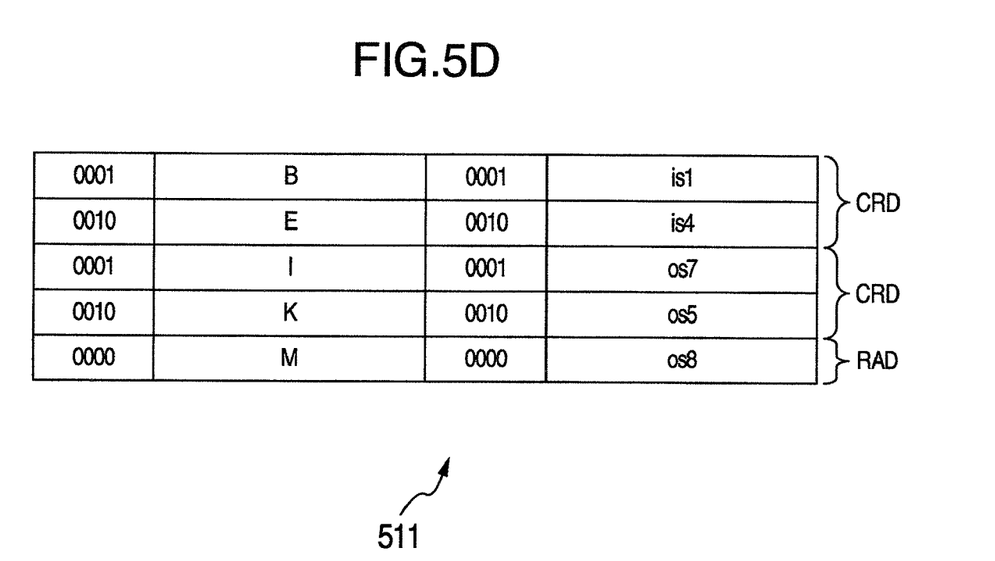
FIG. 5D is a diagram showing a DFL registration status in the case of FIG. 5C.

Here, consider the case where a command to read the logical data, which should have been recorded in the area indicated by the arrow 505 as with the previous example, comes from the host. In the case of the diagram 509, a replacement area of which the usage direction is the same as that of the user data area is selected, so that the clusters corresponding to the defective clusters B-D and E can be arranged in the consecutive addresses as the replacement clusters is1-is4. Accordingly, unlike the case of the diagram 501, data can be read with one read access as consecutive clusters indicated by an arrow 510. A table 511 shows the registered DFL. As can be seen from the table 511, one CRD-type DFL registration was made for B-D immediately after the RAW process in the range A-D, but one CRD-type DFL registration can be made again for B-E using the result of the RAW process in the range E-H.

Note that, although not described, if the clusters I-K are determined as defective clusters in the RAW process in the range I-L, the OSAO is selected in the case of the diagram 509 because the last cluster L is not a defective cluster. However, the OSAO does not necessarily need to be selected as a replacement area, and the ISAO may be selected in the sense that one CRD-type registration cannot be made collectively for the defective clusters registered in the sequential RAW processes. That is, either OSAO or ISAO may be selected. Similarly, also when the first cluster M in the RAW process in the range M-P is a defective cluster, the OSAO is selected in the case of the diagram 509 because the last cluster L in the previous RAW process is not a defective cluster. However, the OSAO does not necessarily need to be selected as a replacement area and the ISAO may be also selected for the same reason. That is, either OSAO or ISAO may be selected.

Moreover, from the viewpoint of saving the ISAO of which the usage direction is the same as that of the user data area, the following methods may be contemplated:

a method, wherein the ISAO is selected only when one CRD-type registration can be made collectively for clusters registered in the sequential RAW processes, while the OSAO is selected when one CRD-type registration cannot be made collectively for clusters registered in the sequential RAW processes; and a method, wherein the closest replacement area is selected only when one CRD-type registration cannot be made collectively for the clusters registered in the sequential RAW processes.

Note that, suppose if the cluster E is not a defective cluster in the RAW process of the clusters E-H or if only cluster F is a defective cluster, then the defective clusters registered in the sequential RAW processes just cannot be handled collectively as the CRD type, which poses specifically no problem in selecting the ISAO as the replacement clusters.

Moreover, we have explained that a rule that the defect management process is performed in a replacement area close to the location where a defective cluster occurs is adopted. However, this is a convenient hypothetical rule and thus no specific problems arise even if this rule is not adopted.

Figure 6:
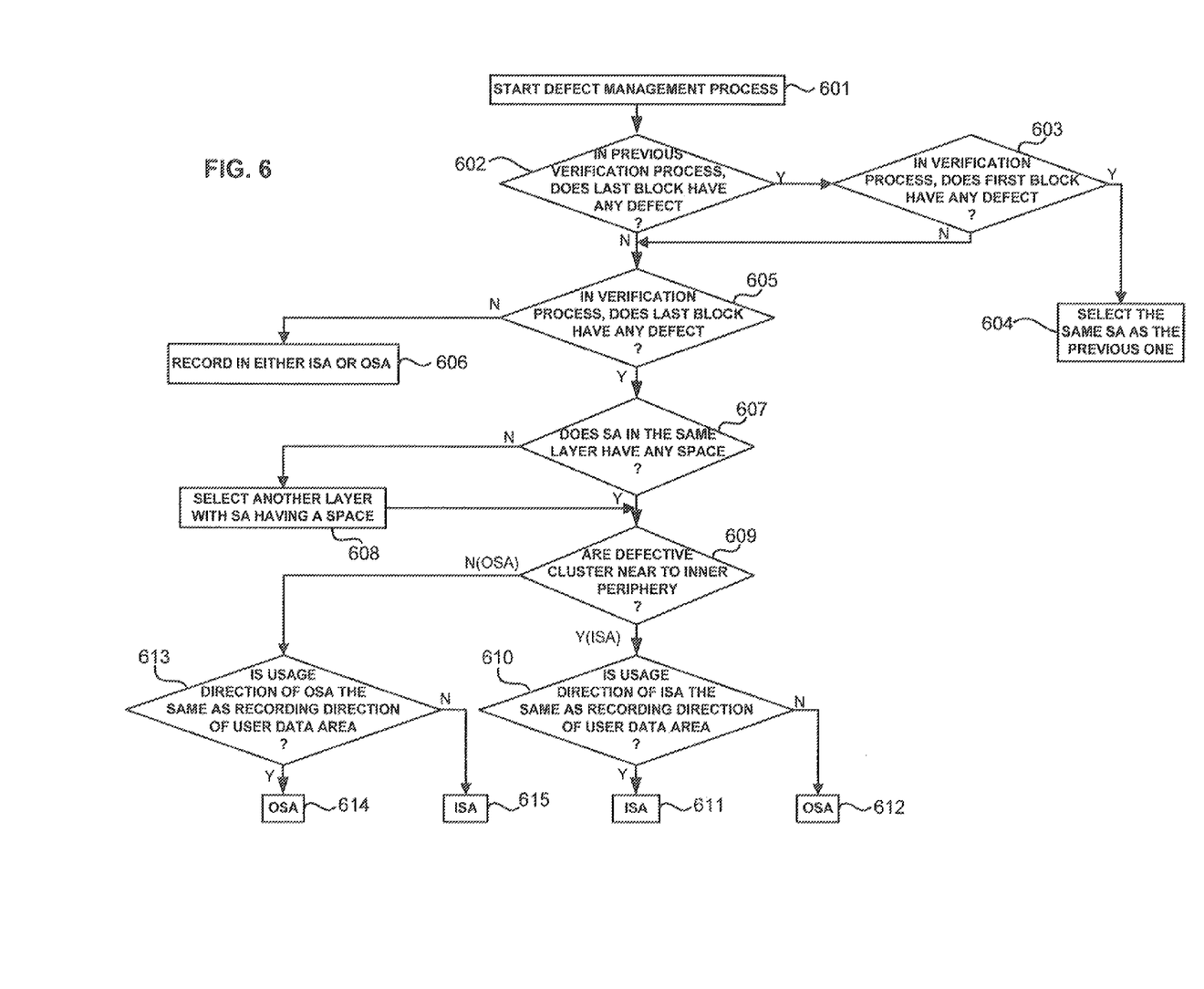
FIG. 6 shows an example of a flowchart according to the embodiment.

Finally, an example of a flowchart in this embodiment is described using FIG. 6. First, after recording, verification is performed to start the defect management process (601). It is determined whether or not the result of the previous verification process is that the defect management process has been performed on the last block having a defect (602). Since one CRD-type registration might be able to be made collectively if the answer is YES, it is determined whether or not the result of the current verification process is that the defect management process has been performed on the first block having a defect (603). If the answer is YES, then the same replacement area (SA) as the previous one is selected (604). If the answer is NO in both steps 602 and 603, then it is determined whether or not the result of this verification process is that the defect management process has been performed on the last block having a defect (605). If the answer is NO, the one CRD-type registration cannot be made collectively and therefore the recording may be made in either the ISA or OSA (606). If the answer is YES, it is determined whether or not there is any space in replacement areas on the same layer as the layer of defective cluster addresses (607). If there is no space (the answer is NO), another recording layer with a replacement area having a space is selected (608). If there is a space (the answer is YES), it is further determined whether the defective cluster addresses are close to the ISA or OSA (609). Note that the step 609 is not indispensable. If it is determined that it is close to the ISA (the answer is YES), then it is determined whether or not the usage direction of the ISA is the same as the recording direction of the user data area (610). If it is the same (the answer is YES), the ISA is selected (611), while if it is different (the answer is NO), the OSA is selected (612). Hereafter, similarly, if it is determined that it is close to the OSA (the answer is NO), then it is determined whether or not the usage direction of the OSA is the same as the recording direction of the user data area (613). If it is the same (the answer is YES), the OSA is selected (614), while if it is different (the answer is NO), the ISA is selected (615). Note that, in this flowchart, assume that the usage directions of the ISA and OSA differs from each other in the same layer.

As described above, according to the present invention, in two sequential RAW processes, when the last cluster in the first RAW process and the first cluster in the next RAW process might be able to be registered collectively as a CRD type defect, replacement areas of which the usage direction is the same as that of the user data area is selected so as to prevent the degradation in read access performance to the replacement data recorded in replacement areas and furthermore to suppress the waste of the number of DFL registrations, thereby solving the problems.

Moreover, in this embodiment, although a disc has been described taking a BD-RE SL as an example, it is obvious that the same effect can be obtained regardless of whether a single layer disc or a multilayer disc. Particularly in the multilayer disc, there is a layer in which the recording direction of the inner user data area is different from that of the outer user data area. However, in applying the present invention to all the layers, there is nothing special to be considered.

A rewritable medium has been described as an example in this embodiment. However, since the difference between a write-once medium and a rewritable medium is only that between writing once and overwriting various data, the same effect can be obtained even if the present invention is applied to the write-once medium.

Moreover, it should be appreciated that the present invention can be applied to not only the optical disc described in this embodiment but also any recording medium having the concepts of the area used for defect management process and the area for storing management information, and that the same effect can be obtained.

In the foregoing, the preferable embodiment of the present invention has been described using the accompanying drawings. According to the present invention, attention is paid to the usage direction of a user data area and that of a replacement area. In the case where one CRD type DFL registration can be made collectively in the sequential defect management processes and the usage direction of replacement areas close to the replacement clusters is different from that of the user data area, the recording is made in replacement areas of which the usage direction is the same as that of the user data area without recording in those of which the usage direction is different from that of the user data area, and thereby it can be achieved to prevent the degradation in read access performance to the replacement data and to suppress the waste of the number of DFL registrations.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A recording/reproducing apparatus with a defect management function that records/reproduces in a predetermined unit of recording blocks using a medium having a user data area, a replacement area, and an area for storing management information updated at least when the replacement area is used, the recording/reproducing apparatus comprising:
   a verification unit for performing a verification process to reproduce recorded data and determine a reproduction result;
   a DFL registration determining unit for determining a type of DFL registration based on an outcome determined by the verification unit;
   a management information storage unit for storing management information including DFL information in the area for storing management information based on an outcome determined by the DFL registration determining unit; and
   a replacement data recording unit for recording replacement data in the replacement area based on an outcome determined by the DFL registration determining unit, wherein
   in a defect management process, when a defective area has only one of the recording blocks, the one recording block is registered in a DFL (Defect List) as a RAD (Re-Allocated Defect) type, while when the defective area has consecutive recording blocks, the consecutive recording blocks are registered in the DFL as a CRD (Contiguous Re-allocated Defect) type;
   when the medium has a plurality of replacement areas and a replacement area A of which the usage direction is the same as that of the user data area and another replacement area B of which the usage direction is different from that of the user data area are mixed, the replacement data recording unit records defective blocks in the user data area to be registered as the CRD type in the replacement area A, but does not record the same in the replacement area B; and
   in the medium having a defective block registered as the RAD type in the replacement area B, when due to registration of a new defective block, the defective block registered as the RAD type and the new defective block can be re-registered as the CRD type,
      the replacement data recording unit deletes the defective block registered as the RAD type from the replacement area B and records the defective blocks to be re-registered as the CRD type in the replacement area A.

2. The recording/reproducing apparatus according to claim 1, wherein in a case where the medium has a plurality of recording layers,
   when unable to record the defective blocks in the replacement area A on the same layer as the user data area, the replacement data recording unit records the defective blocks in the replacement area A on a different layer.

3. The recording/reproducing apparatus according to claim 1, wherein in a case where the verification unit performs a verification process in a unit of a predetermined number of blocks,
   when the verification unit performs an N-th verification process (N is a natural number) and an (N+1)th verification process sequentially,
   if as a result of the N-th verification process, it is determined that one or more consecutive blocks including the last recording block in the unit of the N-th verification process are defective blocks, then the replacement data recording unit records the defective blocks in the replacement area A.

4. The recording/reproducing apparatus according to claim 3, wherein if as a result of the N-th verification process, the last recording block in the unit of the N-th verification process is not a defective block, the replacement data recording unit records the defective blocks in the replacement area B.

5. The recording/reproducing apparatus according to claim 3, wherein if as a result of the (N+1)th verification process, it is determined that one or more consecutive blocks including the first recording block in the unit of the (N+1)th verification process are defective blocks, then the replacement data recording unit records the defective blocks in the replacement area A.

6. The recording/reproducing apparatus according to claim 3, wherein if as a result of the (N+1)th verification process, the first recording block in the unit of the (N+1)th verification process is not a defective block, then the replacement data recording unit records the defective blocks in the replacement area B.

7. A recording method in a recording/reproducing apparatus with a defect management function that records/reproduces in a predetermined unit of recording blocks using a medium having a user data area, a replacement area, and an area for storing management information to be updated when the replacement area is used, wherein the recording method comprises the steps of:
   in a defect management process, when a defective area has only one of the recording blocks, registering the one recording block in a DFL (Defect List) as a RAD (Re-Allocated Defect) type, while when the defective area has consecutive recording blocks, registering the consecutive recording blocks in the DFL as a CRD (Contiguous Re-allocated Defect) type;
   when the medium has a plurality of replacement areas and a replacement area A of which the usage direction is the same as that of the user data area and a replacement area B of which the usage direction is different from that of the user data area are mixed, recording defective blocks in the user data area to be registered as the CRD type in the replacement area A, but not recording said defective blocks in the user data area to be registered as the CRD type in the replacement area B; and
   in the medium having a defective block registered as the RAD type in the replacement area B, when due to registration of a new defective block, the defective block registered as the RAD type and the new defective block can be re-registered as the CRD type, deleting the defective block registered as the RAD type from the replacement area B and recording the defective blocks to be re-registered as the CRD type in the replacement area A.

8. The recording method according to claim 7, further comprising the step of:

in a case where the medium is a medium having a plurality of recording layers, when unable to record the defective blocks in the replacement area A on the same layer as the user data area, recording the defective blocks in the replacement area A on a different layer.

9. The recording method according to claim 7, further comprising the step of:

in a case where a verification process is performed in a unit of a predetermined number of blocks, when an N-th verification process (N is a natural number) and an (N+1)th verification process are performed sequentially, if as a result of the N-th verification process, it is determined that one or more consecutive blocks including the last recording block in the unit of the N-th verification process are defective blocks, then recording the defective blocks in the replacement area A.

10. The recording method according to claim 9, further comprising the step of:

if as the result of the N-th verification process, the last recording block in the unit of the N-th verification process is not a defective block then recording the defective blocks in the replacement area B.

11. The recording method according to claim 9, further comprising the step of:

if as the result of the (N+1)th verification process, it is determined that one or more consecutive blocks including the first recording block in the unit of the (N+1)th verification process are defective blocks, then recording the defective blocks in the replacement area A.

12. The recording method according to claim 9, further comprising the step of:

if as the result of the (N+1)th verification process, the first recording block in the unit of the (N+1)th verification process is not a defective block, then recording the defective blocks in the replacement area B.

* * * * *